United States Patent
Letko et al.

(10) Patent No.: US 10,626,293 B2
(45) Date of Patent: Apr. 21, 2020

(54) ACRYLIC POLYURETHANE COATINGS INCLUDING POLYETHER POLYOLS

(71) Applicant: Dow Global Technologies LLC, Midland, MI (US)

(72) Inventors: Christopher S. Letko, Houston, TX (US); Amber Marie Stephenson, Lake Jackson, TX (US); John N. Argyropoulos, Midland, MI (US); John Klier, Midland, MI (US)

(73) Assignee: DOW Global Technologies LLC, Midland, MI (US)

( * ) Notice: Subject to any disclaimer, the term of this patent is extended or adjusted under 35 U.S.C. 154(b) by 51 days.

(21) Appl. No.: 16/061,872

(22) PCT Filed: Nov. 30, 2016

(86) PCT No.: PCT/US2016/064111
§ 371 (c)(1),
(2) Date: Jun. 13, 2018

(87) PCT Pub. No.: WO2017/105835
PCT Pub. Date: Jun. 22, 2017

(65) Prior Publication Data
US 2018/0355211 A1    Dec. 13, 2018

Related U.S. Application Data

(60) Provisional application No. 62/268,602, filed on Dec. 17, 2015.

(51) Int. Cl.
| | | |
|---|---|---|
| *C09D 175/16* | (2006.01) | |
| *C08G 18/62* | (2006.01) | |
| *C08G 18/79* | (2006.01) | |
| *C08G 18/24* | (2006.01) | |
| *C09D 175/08* | (2006.01) | |
| *C08G 18/40* | (2006.01) | |
| *C08G 18/08* | (2006.01) | |
| *C08G 18/48* | (2006.01) | |

(52) U.S. Cl.
CPC ....... *C09D 175/16* (2013.01); *C08G 18/0842* (2013.01); *C08G 18/246* (2013.01); *C08G 18/4063* (2013.01); *C08G 18/4829* (2013.01); *C08G 18/4845* (2013.01); *C08G 18/6229* (2013.01); *C08G 18/792* (2013.01); *C09D 175/08* (2013.01)

(58) Field of Classification Search
CPC ............... C09D 175/16; C09D 175/08; C08G 18/0842; C08G 18/4829; C08G 18/4845; C08G 18/246; C08G 18/4063; C08G 18/6229; C08G 18/792
See application file for complete search history.

(56) References Cited

U.S. PATENT DOCUMENTS

| | | |
|---|---|---|
| 4,322,508 A | 3/1982 | Peng et al. |
| 4,384,103 A | 5/1983 | Chattha |
| 4,417,022 A | 11/1983 | Chang et al. |
| 4,535,142 A | 8/1985 | Brauer et al. |
| 4,937,366 A | 6/1990 | Nodelman |
| 5,115,015 A | 5/1992 | Forrest, Jr. et al. |
| 5,155,201 A | 10/1992 | Gardon et al. |
| 2005/0159625 A1 | 7/2005 | Coates et al. |

OTHER PUBLICATIONS

International Preliminary Report dated Jun. 28, 2018 pertaining to International Application No. PCT/US2016/064111.
International Search Report and Written Opinion pertaining to PCT/US2016/064111 dated Feb. 23, 2017.
International Preliminary Report on Patentability pertaining to PCT/US2016/064111 dated Jun. 28, 2018.

*Primary Examiner* — Rabon A Sergent
(74) *Attorney, Agent, or Firm* — Dinsmore & Shohl LLP

(57) ABSTRACT

An acrylic polyurethane coating composition, comprising an isocyanate component comprising at least one polyisocyanate trimer; and an isocyanate reacting mixture, the isocyanate reacting mixture comprising from 25 wt % to 80 wt % of an acrylic polyol and from 1 wt % to 30 wt % of a polyether polyol, based on a total weight of the acrylic polyurethane coating composition, the acrylic polyol having a solids content of at least 50 wt %, based on a total weight of the acrylic polyol, and the polyether polyol having a viscosity of less than 500 mPa*s at 25° C. and a number average molecular weight greater than 300 and less than 700.

9 Claims, 8 Drawing Sheets

US 10,626,293 B2

ACRYLIC POLYURETHANE COATINGS INCLUDING POLYETHER POLYOLS

CROSS-REFERENCE TO RELATED APPLICATIONS

This application claims priority to U.S. Provisional Application Ser. No. 62/268,602, filed Dec. 17, 2015, which is hereby incorporated by reference in its entirety.

TECHNICAL FIELD

Embodiments of the present disclosure are generally related to acrylic polyurethane coatings including a reactive diluent and methods of making such coatings, and are specifically related to two component acrylic polyurethane coatings having high solids content and including a polyether polyol as the reactive diluent.

BACKGROUND

Two component polyurethane coatings are used in a variety of applications. For some of these applications, the coating is applied to the substrate via a spray gun. Spray applications typically require the use of solvent additives to reduce the viscosity of the coating composition into a range compatible with the spray gun. Unfortunately, high levels of solvent additives may lead to increased volatile organic compound (VOC) levels in the resultant polyurethane coatings, which in turn, may lead to increased concerns regarding the toxicity of the coatings. In particular, VOCs are organic chemicals that have a high vapor pressure at ordinary room temperature (or low boiling point), which may cause large numbers of molecules to evaporate or sublimate from the coating and enter the surrounding air. VOCs are typically regulated by law.

Accordingly, there is a need for polyurethane coating compositions that reduce the use of such solvent additives that provide increased VOC levels in the resultant coatings, while still providing desirable coating properties (such as hardness and UV weatherability).

SUMMARY

According to one embodiment, a polyurethane coating composition comprises an acrylic polyurethane coating composition, comprising an isocyanate component comprising at least one aliphatic polyisocyanate trimer or biuret; and an isocyanate reacting mixture, the isocyanate reacting mixture comprising from 25 wt % to 80 wt % of an acrylic polyol and from 1 wt % to 30 wt % of a polyether polyol, based on a total weight of the acrylic polyurethane coating composition, the acrylic polyol having a solids content of at least 50 wt %, based on a total weight of the acrylic polyol, and the polyether polyol having a viscosity of less than 500 mPa*s at 25° C. and a number average molecular weight greater than 300 and less than 700.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
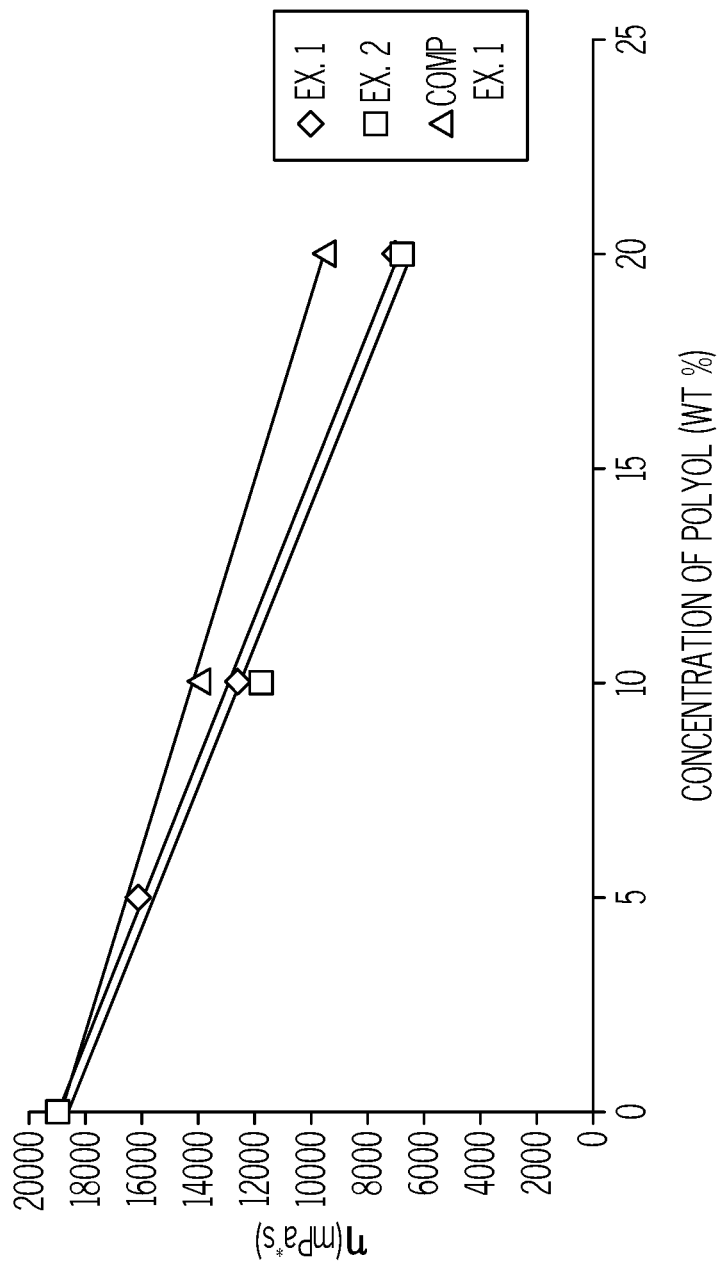
FIG. 1 graphically depicts the viscosity (y-axis) as a function of concentration (x-axis) of different concentrations of polyol diluents mixed with an acrylic polyol, and a comparative example including a caprolactone diluent mixed with the acrylic polyol.

Embodiments are directed to acrylic polyurethane coatings produced from the reaction of isocyanates and isocyanate reacting mixtures comprising one or more high solids content acrylic polyols and one or more low molecular weight/low viscosity polyether polyols as reactive diluents (also referred to as polyol diluents). By reactive diluent it is meant that the polyether polyols may be incorporated into the matrix of the acrylic polyurethane coating. As such, the reactive diluent may essentially avoid being susceptible to evaporation from the coating, as may be typical with non-reactive diluents. The resultant acrylic polyurethane coatings made using the reactive diluents may still provide for a high solids content (greater than about 50 wt %) in the composition for forming the acrylic polyurethane coating (and the resultant coating), while reducing the use of typical solvent additives that provide for increased volatile organic compound (VOC) loading in the coating, and while still obtaining desirable coating properties (such as hardness and UV weatherability).

In various embodiments, a formulation for producing a high-solids, two component acrylic polyurethane coating is provided. In general, the formulation includes an isocyanate component and an isocyanate reacting mixture including polyols that react with the isocyanate component. The isocyanate component may be, in various embodiments, an aliphatic polyisocyanate trimer or biruet. According to various embodiments, the isocyanate reacting mixture includes at least an acrylic polyol and a polyether polyol. The polyether polyol has a viscosity of less than 500 mPa*s at 25° C. and a number average molecular weight greater than 300 and less than 700 g/mol. In some embodiments, the resultant polyurethane coating has a solids content of greater than 50%.

In various embodiments, the polyurethane coating composition may include from about 25 wt % to about 85 wt %, from about 30 wt % to about 80 wt %, or even from about 40 wt % to about 78 wt % of the isocyanate reacting mixture based on the weight of the polyurethane coating composition. In still further embodiments, the polyurethane coating composition includes from about 25 wt % to about 70 wt % of the isocyanate reacting mixture based on the weight of the polyurethane coating composition.

In further embodiments, the isocyanate reacting mixture may include from about 1 wt % to about 20 wt % of the polyether polyol, or from about 2 wt % to about 15 wt % of the polyether polyol, or from about 3 wt % to about 10 wt % of the polyether polyol based on the weight of the polyurethane coating composition. The isocyanate reacting mixture may include from about 5 wt % to about 20 wt % of the polyether polyol, or from about 6 wt % to about 15 wt % of the polyether polyol, or even from about 6.5 wt % to about 14 wt % of the polyether polyol based on the weight of the isocyanate reacting mixture.

Various molecular weights are contemplated for the polyether polyol. The polyether polyol may be derived from one or more alkylene oxides such as propylene oxide, ethylene oxide, and/or butylene oxide, as would be understood by a person of ordinary skill in the art. For example, the polyether polyol may be prepared by reacting the one or more alkylene oxides with one or more initiators having from 2 to 10 active hydrogens, in the presence of a polymerization catalyst. The polyether polyol may have a number average molecular weight of from about 400 g/mol to about 700 g/mol. In some embodiments, the molecular weight is greater than about 400 g/mol or greater than about 450 g/mol. In other embodiments, the molecular weight may be less than about 700 g/mol, less than about 650 g/mol, or less than about 600 g/mol. Accordingly, in some embodiments, the polyether polyol has a molecular weight of from about 425 g/mol to about 650 g/mol or from about 450 g/mol to about 600 g/mol. Examples of suitable polyether polyols include, but are not limited to, those commercially available under the trademark VORAPEL™, such as VORAPEL™ T5001 (having a hydroxyl number of 275 mg KOH/g and a viscosity of from about 300 to about 360 mPa*s at 25° C.), and those commercially available under the trademark VORANOL™, such as VORANOL™ CP450 (having a hydroxyl number of 370-390 mg KOH/g, a viscosity of from about 300 to about 360 mPa*s at 25° C., and an average functionality of 3), both available from The Dow Chemical Company (Midland, Mich.).

For example, the polyether polyol may be a polyether triol that is produced by the alkoxylation of a trifunctional initiator by an epoxide in the presence of polymerization catalyst. For example, a reaction mixture of one or more alkylene oxides (such as propylene oxide, ethylene oxide, and/or butylene oxide,) and glycerin as the initiator may form a glycerin-initiated polyether triol. Examples of initiators include glycerin, trimethylolpropane, triethanolamine, 1,2,6-hexane triol, monoethanolamine, diethanolamine, aminoethylpiperazine, among others. Examples of polymerization catalysts include double metal cyanide complex (DMC) catalysts and alkali hydroxide catalysts (e.g. sodium hydroxide and potassium hydroxide).

In further exemplary embodiments, the isocyanate reacting mixture includes from 1 wt % to about 20 wt % of polyoxybutylene polyol (e.g., from about 2 wt % to about 15 wt %, from about 3 wt % to about 10 wt %, etc.). The polyoxybutylene polyol may be derived from 100 wt % of butylene oxide, based on the total weight of alkylene oxides. In other exemplary embodiments, the isocyanate reacting mixture includes from 1 wt % to about 20 wt % of polyoxypropylene polyol (e.g., from about 2 wt % to about 15 wt %, from about 3 wt % to about 10 wt %, etc.). The polyoxypropylene polyol may be derived from 100 wt % of propylene oxide, based on the total weight of alkylene oxides.

As used herein, a hydroxyl number is the milligrams of potassium hydroxide equivalent to the hydroxyl content in one gram of the polyol or other hydroxyl compound. In some embodiments, the resultant polyether polyol has a hydroxyl number of from about 225 mg KOH/g to about 475 mg KOH/g. In still other embodiments, the resultant polyether polyol has a hydroxyl number of from about 275 mg KOH/g to about 400 mg KOH/g. In exemplary embodiments, the polyether polyol is a triol and has a hydroxyl number from 250 mg KOH/g to 450 mg KOH/g. The polyether polyol may have a nominal hydroxyl functionality of from about 3 or greater (e.g., from 3 to 6, from 3 to 5, from 3 to 4, or 3). The polyether polyol may have an average overall hydroxyl functionality of from about 2.5 to about 4.5 (e.g., 2.5 to 3.5). As used herein, the hydroxyl functionality (nominal and average overall) is the number of isocyanate reactive sites on a molecule, and may be calculated as the total number of moles of OH over the total number of moles of polyol.

The viscosity of the resulting polyether polyol is generally less than 500 mPa*s at 25° C. as measured by ASTM D4878. In some embodiments, the viscosity is between 100 mPa*s and 500 mPa*s, between 200 mPa*s and 400 mPa*s, or between 300 mPa*s and 360 mPa*s at 25° C.

In various embodiments, the isocyanate reacting mixture further includes at least one acrylic polyol. The acrylic polyol has a solids content of at least 50 wt %, based on a total weight of the acrylic polyol, for example from 60 wt % to 80 wt %, from 69 wt % to 79 wt %, etc. The acrylic polyol may have a hydroxyl equivalent weight of from about 400 to about 1000 g/mol equivalence. For example, the acrylic polyol may have a hydroxyl equivalent weight, on a solids basis, of from 350 to 550 g/mol equivalence. The acrylic polyol may have a number average molecular weight, on a solids basis, from 5,000 g/mol to 15,000 g/mol, for example 6,000 g/mol to 11,000 g/mol, from 6,900 g/mol to 10,900 g/mol, etc.

In some embodiments, the acrylic polyol has a viscosity (as-supplied) that exceeds about 4,000 mPa*s at 25° C. as measured by ASTM D4878, a viscosity that exceeds 4,500 mPa*s, or even a viscosity that exceeds 5,000 mPa*s. In various embodiments, the viscosity of the acrylic polyol is below 20,000 mPa*s. Accordingly, the acrylic polyol may have a viscosity between 4,000 mPa*s and 20,000 mPa*s or a viscosity between 4,500 mPa*s and 15,000 mPa*s. The acrylic polyol may have an acid number, on a solids basis, from 2.5 mg KOH/g to 3.5 mg KOH/g.

In various embodiments, the isocyanate reacting mixture may include at least about 20 wt %, at least about 30 wt %, or at least about 40 wt % of the acrylic polyol based on the weight of the polyurethane coating composition. The isocyanate reacting mixture may include less than 84 wt %, less than 80 wt %, less than 70 wt % of acrylic polyol based on the weight of the polyurethane coating composition. Moreover, the isocyanate reacting mixture may include from about 20 wt % to about 80 wt % of the acrylic polyol, or from about 30 wt % to about 70 wt % of the acrylic polyol, or from about 40 wt % to about 60 wt % of the acrylic polyol based on the weight of the polyurethane coating composition. A weight ratio of the acrylic polyol to the polyether polyol may be from 5 to 15, for example, from 6 to 14, from 7 to 14, etc. In some embodiments, the isocyanate reacting mixture may include a carboxylic acid source to afford an acid number value of 2.5 mg KOH/g to 8 mg KOH/g. The carboxylic acid source may be included into the isocyanate reacting mixture either as an additive or by means of an acrylic polyol having carboxylic acid functionality.

Various compositions are considered suitable for the isocyanate component. The isocyanate component includes one or more polyisocyanates (as interchangeable referred to as polyisocyanurates) and may optionally include one or more isocyanate-terminated prepolymers derived from one or more polyisocyanates. In various embodiments, the isocyanate component includes at least one aliphatic polyisocyanate trimer or biuret. The amount of isocyanate component may vary based on application. In some embodiments, the polyurethane coating composition may include from about 15 wt % to about 40 wt %, from about 20 wt % to about 35 wt %, or even from about 22 wt % to about 30 wt % of the isocyanate based on the weight of the polyurethane coating composition. In various embodiments, the isocyanate component has a total equivalent range of from about 100 to about 250.

Exemplary polyisocyanates include aromatic, cycloaliphatic, and aliphatic polyisocyanates. In various embodiments, the isocyanate component has a calculated total isocyanate functionality of greater than about 2 and/or from about 1.5 to about 5.5 (e.g., from 2.5 to 5.5, from 2.8 to 5.5, from 2.9 to 4.5, from 2.9 to 4.0, from 2.9 to 3.7, etc.). As would be understood by a person of ordinary skill in the art, by calculated isocyanate functionality it is meant the isocyanate functionality is calculated based on the isocyanate functionality of each of the isocyanate-containing components in the isocyanate component and based on the weight of such components in the isocyanate component.

In exemplary embodiments, the isocyanate component includes a preformed isocyanurate tri-isocyanate, which may also be referred to herein as a polyisocyanate trimer and/or polyisocyanurate trimer. For example, the isocyanate component may include one or more preformed aliphatic isocyanate based polyisocyanate trimers, one or more preformed cycloaliphatic isocyanate based polyisocyanate trimers, or combinations thereof. By preformed it is meant that the polyisocyanate trimer is prepared prior to preparing the isocyanate component and/or prior to making a coating that incorporates the polyisocyanate trimer therewithin. Accordingly, the isocyanurate tri-isocyanate is not prepared via in situ trimerization during formation of a coating.

In particular, one way of preparing polyisocyanates trimers is by achieving in situ trimerization of isocyanate groups, in the presence of suitable trimerization catalyst, during a process of forming polyurethane polymers. For example, the in situ trimerization may proceed as shown below with respect to Schematic (a), in which a diisocyanate is reacted with a diol (by way of example only) in the presence of both a urethane catalyst and a trimerization (i.e. promotes formation of isocyanurate moieties from isocyanate functional groups) catalyst. The resultant polymer includes both polyurethane polymers and polyisocyanurate polymers, as shown in Schematic (a), below.

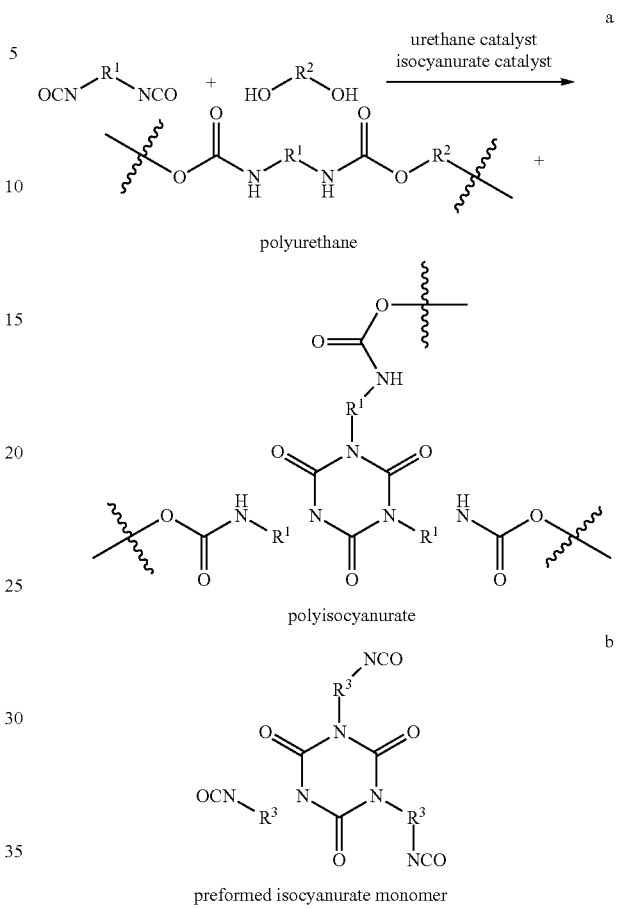

Schematics (a) and (b)

polyurethane polyisocyanurate preformed isocyanurate monomer

In contrast, referring to Schematic (b) above, in embodiments the preformed polyisocyanate trimer is provided as a separate preformed polyisocyanurate-polyisocyanate component, i.e., is not mainly formed in situ during the process of forming polyurethane polymers. The preformed polyisocyanate trimer may be provided in a mixture for forming the coating in the form of a monomer, and not in the form of being derivable from a polyisocyanate monomer while forming the coating. In exemplary embodiments, the isocyanate component includes from 80 wt % to 100 wt % (e.g., 90 wt % to 100 wt %, 99 wt % to 100 wt %, etc.) of the polyisocyanate trimer, based on the total amount of the isocyanate component.

For example, in some embodiments the isocyanate component may include polyisocyanate trimers derived from hexamethylene diisocyanate (HDI) (modifications, derivatives, and blends thereof), methylene dicyclohexyl diisocyanate (modifications, derivatives, and blends thereof), and/or isophorone diisocyanate (IPDI) (modifications, derivatives, and blends thereof). Modifications and derivatives of any of the foregoing polyisocyanate groups that contain, e.g., biuret, urea, carbodiimide, allophanate, and/or isocyanurate groups, may be used. Many other aliphatic and cycloaliphatic polyisocyanates that may be used (but not limiting with respect to the scope of the embodiments) are described in, e.g., U.S. Pat. No. 4,937,366. It is understood that in any of these polyisocyanate trimers, one can also use both aliphatic and cycloaliphatic isocyanates to form a preformed hybrid isocyanurate tri-isocyanate, and that when the term "aliphatic isocyanate based isocyanurate tri-isocyanate" is used, that such a hybrid is also included. For example, the isocyanate component may include pre-formed polyisocyanate trimers derived from hexamethylene diisocyanate and/or isophorone diisocyanate.

Aliphatic polyisocyanate biurets may also be used as the isocyanate component. For example, these biurets may be created by treating hexamethylene diisocyanate with water, as would be known to one of ordinary skill in the art. In particular, biuret-containing oligomers are introduced into the polyisocyanate starting material through a reaction with water, certain amine compounds, monosubstituted ureas such as N,N'-dialkyl urea compounds, formic acid and tertiary alcohol compounds. Water is a preferred biureting reagent because of its low cost and because it tends to react cleanly without forming large quantities of unwanted by-products. Water reacts with two polyisocyanate groups to produce a urea structure; further reaction of this urea structure with a third polyisocyanate molecule produces a biuret group.

The isocyanate component may include other polyisocyanates or isocyanate-terminated prepolymers derived from such other polyisocyanates. Examples of such polyisocyanates include 4,4'-, 2,4'- and 2,2'-isomers of methane diphenyl diisocyanate (MDI), modifications, and blends thereof (e.g., polymeric or monomeric MDI blends), and 2,4- and 2,6-isomers of toluene-diisocyanate (TDI) (e.g., modifications, and blends thereof). Modifications and derivatives of any of the foregoing polyisocyanate groups that contain, e.g., biuret, urea, carbodiimide, allophonate, and/or isocyanurate groups, may be used.

The formulation may further include additives or other modifiers. For example, organic solvents and catalysts may be employed. Catalysts may include, by way of example and not limitation, amine catalysts, tin catalysts, and the like. The amount of catalyst may be from about 0.005 wt % and 5 wt % of the polyurethane coating composition, depending on the nature of the isocyanate and/or depending on whether the catalyst is provided in a carrier, as would be understood by a person of ordinary skill in the art. In some embodiments, the polyurethane coating composition includes from about 1 wt % to about 2 wt % of the catalyst based on the weight of the polyurethane coating composition. Tin catalysts may include tin salts, such as the stannous salts of carboxylic acids. In one particular embodiment, the catalyst is dibutyltin dilaureate. Amine catalysts may include, by way of example and not limitation, tertiary amine catalysts. Tertiary amine catalysts include organic compounds that contain at least one tertiary nitrogen atom and are capable of catalyzing the hydroxyl/isocyanate reaction between the isocyanate component and the isocyanate reacting mixture.

Organic solvents may be added to the polyurethane coating composition to further adjust the viscosity of the polyurethane coating composition. In exemplary embodiments, the use of such organic solvents may be minimized based on the use of the polyol diluents. The organic solvent may include, by way of example, organic solvents that do not react with esters or the like. In some specific embodiments, the organic solvent may include methyl isobutyl ketone, butyl propionate, propyl propionate, and combinations thereof. Some embodiments specifically exclude protic or cyclic ethers as suitable organic solvents. In various embodiments, an amount of organic solvent sufficient to achieve a polyurethane coating composition having a viscosity of from about 1 mPa*s to about 70 mPa*s, from about 20 mPa*s to about 65 mPa*s, or even from about 50 mPa*s to about 60 mPa*s at 25° C. is employed. The organic solvent may be included in an amount of from about 1 wt % to about 40 wt %, from about 5 wt % to about 30 wt %, or from about 5 wt % to about 20 wt % based on the weight of the polyurethane coating composition in specific embodiments.

Formulations may also include other additives, such as additives known to one of ordinary skill in the art for use in polyurethane coatings. Examples additives include fillers, chain extenders, moisture scavengers, demolding agents, antifoaming agents, adhesion promoters, curatives, pH neutralizers, UV stabilizers, antioxidants, plasticizers, compatibilizers, flame retardants, flame suppressing agents, smoke suppressing agents, antimicrobial agents, air release agents, and/or pigments/dyes. For example, pigments such as titanium dioxide and/or carbon black may be used to impart color properties to the polyurethane coating composition. Pigments may be in the form of solids or the solids may be pre-dispersed in a resin carrier prior to being added to the polyurethane coating composition.

In various embodiments, the polyurethane coating composition is prepared by mixing the reaction components, including the isocyanate reacting mixture, the organic solvent, the catalyst, and the isocyanate component at room temperature (or at a temperature slightly above room temperature, for example, from about 20° C. to about 27° C. In some embodiments, the isocyanate reacting mixture and the organic solvent may be mixed prior to or upon addition to the isocyanate component. Other additives, including catalysts, may be added to the isocyanate reacting mixture prior to addition of the isocyanate component. Mixing may be performed in a spray apparatus, a mix head, or a vessel. Following mixing, the mixture may be sprayed or otherwise deposited onto a substrate. In some embodiments, the coating composition is mixed immediately before being applied to the substrate. The substrate may be, by way of example and not limitation, a metal substrate such as aluminum or steel, a polymeric substrate, wood, or another suitable type of substrate.

Upon reacting, the mixture adheres to the substrate to produce a polyurethane polymer which is then allowed to cure, either partially or fully. Suitable conditions for promoting the curing of the polyurethane coating composition include a temperature of from about 15° C. to about 150° C. In some embodiments, the acrylic polyurethane coating composition may be curable at temperatures near room temperature, for example, from about 15° C. to about 30° C. In some embodiments, the curing is performed at a temperature of from about 20° C. to about 75° C. In other embodiments, the curing is performed at a temperature of from about 20° C. to about 60° C. In various embodiments, the temperature selected for curing may be selected at least in part based on the amount of time required for the polyurethane coating composition to gel and/or cure at that temperature. Cure time will also depend on other factors, including, for example, the particular components (e.g., catalysts and quantities thereof), and the thickness of the coating. Depending on the embodiment, the coating may have a thickness of from about 0.2 mil to about 10 mil or from about 0.75 mil to about 7.5 mil. In one particular embodiment, the coating has a thickness of from about 0.2 mil to about 5 mil.

Additional insights into the polyurethane coating may be provided by the following properties. The polyurethane coating composition of the present embodiments include a solids content of greater than 50%. Some embodiments exhibit a methyl ethyl keytone (MEK) double rub of greater than 50 or even greater than 200 as measured according to ASTM D4752. Optically, as described further in the examples below, the polyurethane coating composition has a gloss retention of greater than about 90% measured at 20° after 96 h of exposure to 100% humidity at 38° C. after both 1 hour and 24 hours of recovery at ambient conditions as measured according to ASTM D523. The polyurethane coating composition may further exhibit gloss retention of greater than about 80% over a 5,000 hour QUV-A cycling period as measured according to ASTM 4587.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

PARALOID™ AU-830 is an acrylic polyol, having 77 wt % solids dispersed in methyl n-amyl ketone (MAK) solvent, a hydroxyl equivalent weight on a solids basis of 500 g/mol equivalence, an acid number on a solids basis of 3 mg KOH/g, a number average molecular weight on a solids basis of 7,000 g/mol, and an as-supplied viscosity at 25° C. of 15,000 mPa*s, available from The Dow Chemical Company (Midland, Mich.);

PARALOID™ AU-1453 is an acrylic polyol, having 70 wt % solids, dispersed in n-butyl acetate solvent, a hydroxyl equivalent weight on a solids basis of 460 g/mol equivalence, an acid number on a solids basis of less than 2 mg KOH/g, a number average molecular weight on a solids basis of 10,000 g/mol, and an as-supplied viscosity at 25° C. of 4500 mPa*s, available from The Dow Chemical Company (Midland, Mich.);

VORAPEL™ T5001 is a polyether polyol, having a nominal hydroxyl functionality of 3, a hydroxyl number of 275 mg KOH/g, a number average molecular weight of 600 g/mol, and a viscosity at 25° C. of 322 mPa*s, available from The Dow Chemical Company (Midland, Mich.);

VORANOL™ CP450 is a polyether polyol, having a nominal hydroxyl functionality of 3, a hydroxyl number of 370-396 mg KOH/g, a number average molecular weight of 450 g/mol, and a viscosity at 25° C. of 300-360 mPa*s available from The Dow Chemical Company (Midland, Mich.);

VORANOL™ 2070 is a polyether polyol, having a nominal hydroxyl functionality of 3, a hydroxyl number of 238 mg KOH/g, a number average molecular weight of 700 g/mol, and a viscosity at 25° C. of 238 mPa*s available from The Dow Chemical Company (Midland, Mich.);

CAPA™ 3050 is a polyester polyol (polycaprolactone) with a molecular weight of about 540 g/mol, available from Perstorp Polyols, Inc.;

Desmodur® N3390 is a preformed polyisocyanate trimer derived from hexamethylene diisocyanate (HDI) supplied in butyl acetate (90% solids), available from Bayer Corporation; and DBTDL is dibutlytin dilaureate, available as 1 wt % solids in butyl acetate.

Table 1 below lists Examples 1-4, which are four example embodiments of the present formulations that include a polyether polyol as a reactive diluent, and Comparative Examples 1 and 2, which include a polyester polyol in place of the polyether polyol, so as to show an effect on overall viscosity by use of polyether polyols versus polyester polyols.

The compositions in Table 1 were prepared by combining the acrylic polyol (PARALOID™ AU-830 or PARALOID™ AU-1453) with the polyol diluent (VORAPEL™ T5001, VORANOL™ CP450, or CAPA™ 3050) and mixing at 1700 rpm for 1 minute.

TABLE 1

| | | Compositions | | | | |
|---|---|---|---|---|---|---|
| | | PARALOID™ AU-830 (wt %) | PARALOID™ AU-1453 (wt %) | VORAPEL™ T5001 (wt %) | VORANOL™ CP450 (wt %) | CAPA™ 3050 (wt %) |
| Ex. 1 | ~10 wt % | 91 | 0 | 9 | 0 | 0 |
| | ~20 wt % | 83 | 0 | 17 | 0 | 0 |
| Ex. 2 | ~10 wt % | 91 | 0 | 0 | 9 | 0 |
| | ~20 wt % | 83 | 0 | 0 | 17 | 0 |
| Ex. 3 | ~10 wt % | 0 | 91 | 9 | 0 | 0 |
| | ~20 wt % | 0 | 83 | 17 | 0 | 0 |
| Ex. 4 | ~10 wt % | 0 | 91 | 0 | 9 | 0 |
| | ~20 wt % | 0 | 83 | 0 | 17 | 0 |
| Comp. Ex. 1 | ~10 wt % | 91 | 0 | 0 | 0 | 9 |
| | ~20 wt % | 83 | 0 | 0 | 0 | 17 |
| Comp. Ex. 2 | ~10 wt % | 0 | 91 | 0 | 0 | 9 |
| | ~20 wt % | 0 | 83 | 0 | 0 | 17 |

Figure 2:
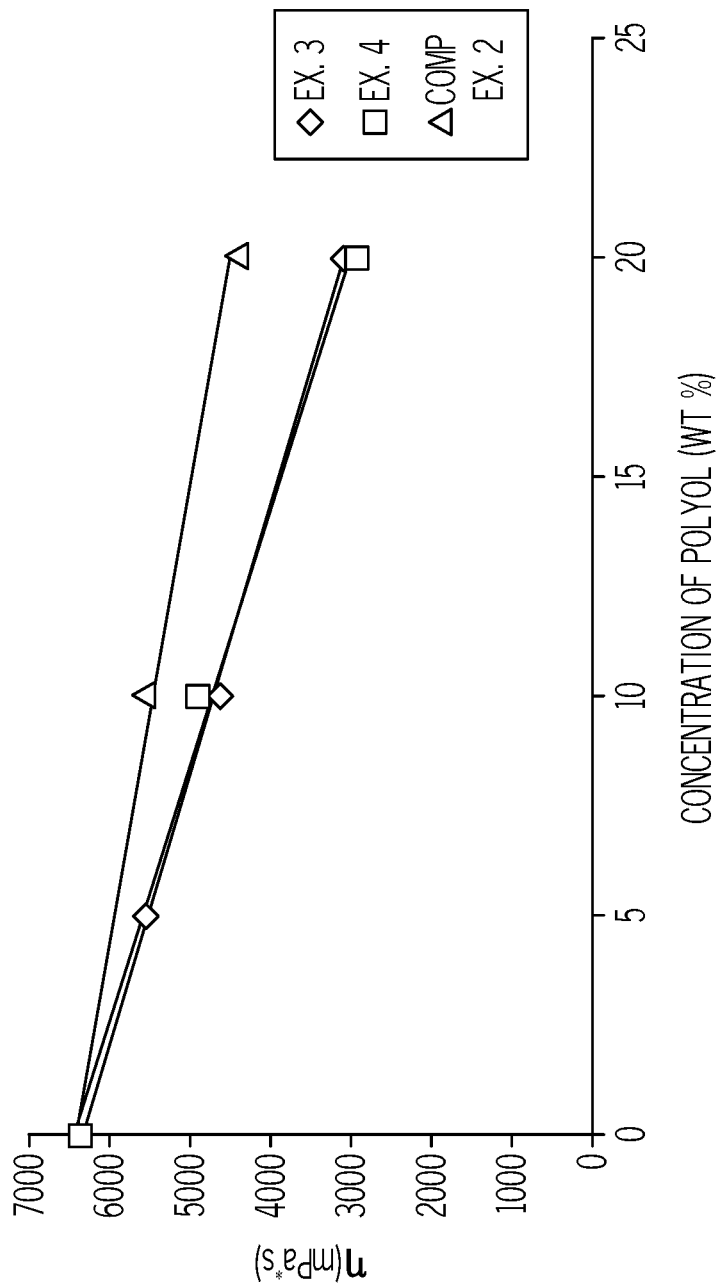
FIG. 2 graphically depicts the viscosity (y-axis) as a function of concentration (x-axis) of different concentrations of polyol diluents mixed with another acrylic polyol, and a comparative example including a caprolactone diluent mixed with the acrylic polyol.

FIGS. 1 and 2 illustrate viscosity (y-axis) as a function of concentration (x-axis) for each of the reactive diluent polyols. In particular, FIG. 1 is a plot of the viscosity versus concentration for the reactive diluent polyols added to PARALOID™ AU-830 and FIG. 2 is a plot of the viscosity versus concentration for the reactive diluent polyols added to PARALOID™ AU-1453. As shown in FIGS. 1 and 2, Examples 1-4 exhibit a decreased viscosity for the coating composition as compared to Comparative Examples 1 or 2. Accordingly, the addition of polyether polyols to the coating composition results in a greater decrease in the viscosity of the coating composition as compared to the addition of a caprolactone polyester polyol (CAPA™ 3050).

Next, the compositions in Tables 2 and 3 were prepared by combining the acrylic polyol (PARALOID™ AU-830 or PARALOID™ AU-1453) with the polyol diluent (VORAPEL™ T5001, VORANOL™ CP450, or CAPA™ 3050) and mixing at 1700 rpm for 1 minute. The solvent blend (methyl isobutyl ketone (MIBK), butyl propionate and propyl propionate [1:1:1]-weight ratio) was then added to the solution, which was then stirred again at 1500 rpm for 1 minute. Next, a 1 wt % solution of dibutyltin dilaureate in butyl acetate was added to the polyol solution and mixed at 1500 rpm for 1 minute. The preformed polyisocyanate trimer (Desmodur® N3390) was then added to the solution and mixed at 1500 rpm for 1 minute. The resulting compositions were immediately coated onto AL-412 (aluminum) and QD-412 (steel) Q-panels using a draw down square, yielding a 3.0-4.5 mil dry thickness. The films were allowed to cure for one day in a fume hood, followed by six additional days on a countertop under ambient conditions before proceeding with measurements.

Examples 5 to 8, and Comparative Examples 3 to 7 were prepared according to the following formulations. In particular, Examples 5 to 8 include polyether polyols according to embodiments in which a number average molecular weight greater than 300 and less than 700. Comparative Example 3 excludes any diluent polyols. Comparative Examples 4 and 5 include polyester polyols, instead of polyether polyols. Comparative Examples 6 and 7 include a polyether polyol have a number average molecular weight of 700.

TABLE 2

Compositions

| Materials | Ex. 5 (wt %) | Ex. 6 (wt %) | Ex. 7 (wt %) | Ex. 8 (wt %) | Comp Ex. 3 (wt %) | Comp Ex. 4 (wt %) | Comp Ex. 5 (wt %) | Comp Ex. 6 (wt %) | Comp Ex. 7 (wt %) |
|---|---|---|---|---|---|---|---|---|---|
| PARALOID ™ AU-1453 | 56.7 | 50.5 | 55.5 | 48.7 | 64.6 | 56.3 | 49.9 | 57.2 | 51.2 |
| VORAPEL ™ T5001 | 4.0 | 7.1 | 0 | 0 | 0 | 0 | 0 | 0 | 0 |
| VORANOL ™ CP450 | 0 | 0 | 3.9 | 6.8 | 0 | 0 | 0 | 0 | 0 |
| VORANOL ™ 2070 | 0 | 0 | 0 | 0 | 0 | 0 | 6.9 | 4.0 | 7.2 |
| CAPA ™ 3050 | 0 | 0 | 0 | 0 | 0 | 3.9 | 25.7 | 0 | 0 |
| Desmodur ® N3390 | 23.7 | 25.1 | 24.7 | 26.8 | 22.0 | 24.1 | 65.0 | 23.3 | 24.4 |
| % solids | 65.0 | 65.0 | 65.0 | 65.0 | 65.0 | 65.0 | 1.6 | 65.0 | 65.0 |
| DBTDL (1%) in butyl acetate | 1.6 | 1.6 | 1.6 | 1.6 | 1.6 | 1.6 | 15.9 | 1.6 | 1.6 |
| Solvent blend | 14.0 | 15.7 | 14.3 | 16.1 | 11.8 | 14.1 | 49.9 | 13.9 | 15.6 |

Examples 9 to 12, and Comparative Examples 8 to 12 were prepared according to the following formulations. In particular, Examples 9 to 12 include polyether polyols according to embodiments in which a number average molecular weight greater than 300 and less than 700. Comparative Example 8 excludes any diluent polyols. Comparative Examples 9 and 10 include polyester polyols, instead of polyether polyols. Comparative Examples 6 and 7 include a polyether polyol have a number average molecular weight of 700.

TABLE 3

Compositions

| Materials | Ex. 9 (wt %) | Ex. 10 (wt %) | Ex. 11 (wt %) | Ex. 12 (wt %) | Comp Ex. 8 (wt %) | Comp Ex. 9 (wt %) | Comp Ex. 10 (wt %) | Comp Ex. 11 (wt %) | Comp Ex. 12 (wt %) |
|---|---|---|---|---|---|---|---|---|---|
| PARALOID ™ AU-830 | 48.9 | 43.8 | 47.9 | 42.3 | 55.3 | 48.6 | 43.3 | 49.3 | 44.5 |
| VORAPEL ™ T5001 | 3.8 | 6.7 | 0 | 0 | 0 | 0 | 0 | 0 | 0 |
| VORANOL ™ CP450 | 0 | 0 | 3.7 | 6.5 | 0 | 0 | 0 | 0 | 0 |
| VORANOL ™ 2070 | 0 | 0 | 0 | 0 | 0 | 0 | 0 | 3.8 | 6.8 |
| CAPA ™ 3050 | 0 | 0 | 0 | 0 | 0 | 3.7 | 6.7 | 0 | 0 |
| Desmodur ® N3390 | 26.2 | 27.3 | 27.1 | 28.8 | 24.9 | 26.5 | 27.8 | 25.8 | 26.6 |
| % solids | 65.0 | 65.0 | 65.0 | 65.0 | 65.0 | 65.0 | 65.0 | 65.0 | 65.0 |
| DBTDL (1%) in butyl acetate | 1.6 | 1.6 | 1.6 | 1.6 | 1.6 | 1.6 | 1.6 | 1.6 | 1.6 |
| Solvent blend | 19.5 | 20.6 | 19.7 | 20.8 | 18.2 | 19.6 | 20.6 | 19.5 | 20.5 |

A comparison of properties of the resultant coatings are shown in Tables 4 and 5, below.

Referring to the properties in Tables 4 and 5, the cross-hatch adhesion was measured in accordance with ASTM Test Method D3359. The MEK double rub was measured in accordance with ASTM Test Method D5402. The König hardness was measured in accordance with ASTM Test Method D4366. The pencil hardness (both gouge and scratch) was measured in accordance with ASTM Test Method D3363. The gloss was measured at 20°, 60°, and 85° in accordance with ASTM Test Method D523. The direct and indirect impact was measured in accordance with ASTM Test Method D2794.

TABLE 4

Coating Properties for Formulations including PARALOID™ AU-1453

| Test | Ex. 5 | Ex. 6 | Ex. 7 | Ex. 8 | Comp Ex. 3 | Comp Ex. 4 | Comp Ex. 5 | Comp Ex. 6 | Comp Ex. 7 |
|---|---|---|---|---|---|---|---|---|---|
| Film thickness (mil) | 3.0-3.5 | 3.0-3.5 | 3.0-3.5 | 3.0-3.5 | 3.0-3.5 | 3.5-4.0 | 3.5-4.0 | 4.0-4.5 | 3.5-4.5 |
| Cross Hatch Adhesion | 5B | 5B | 5B | 5B | 5B | 5B | 5B | 5B | 5B |
| MEK Double Rubs | >200 | >200 | >200 | >200 | >200 | >200 | >200 | >200 | >200 |
| Konig Hardness (s) | 63 ± 6 | 73 ± 1 | 78 ± 10 | 98 ± 7 | 89 ± 8 | 53 ± 4 | 46 ± 2 | 27 ± 2 | 25 ± 1 |
| Pencil Hardness - gouge | B | 2B | 2B | B | 2B | <4B | <4B | <4B | <4B |
| Pencil Hardness - scratch | HB | B | B | HB | B | <4B | <4B | <4B | <4B |
| Gloss - 20° | 125 ± 4 | 116 ± 1 | 120 ± 2 | 120 ± 1 | 116 ± 1 | 118 ± 3 | 116 ± 1 | 120 ± 1 | 117 ± 1 |
| Gloss - 60° | 116 ± 1 | 117 ± 1 | 117 ± 1 | 116 ± 1 | 114 ± 1 | 116 ± 2 | 114 ± 1 | 118 ± 1 | 117 ± 1 |
| Gloss - 85° | 103 ± 1 | 100 ± 1 | 100 ± 1 | 99 ± 1 | 102 ± 1 | 100 ± 1 | 102 ± 1 | 96 ± 1 | 97 ± 1 |
| Direct Impact (N * m) | 13.6 | 18.1 | 15.8 | 13.6 | 13.6 | 13.6 | 13.6 | 13.6 | 13.6 |
| Indirect Impact (N * m) | 15.8 | 13.6 | 15.8 | 13.6 | 13.6 | 15.8 | 15.8 | 15.8 | 15.8 |

Referring to Table 4, it is shown that use of polyether polyol according to embodiments with the acrylic polyol PARALOID™ AU-1453 provides coating properties similar to, if not improved, with respect to Comparative Example 3, which does not include a reactive diluent. Further, use of the polyether polyols in Examples 5-8 provides improvement with respect to hardness as compared to the use of higher molecular weight polyether polyols.

TABLE 5

Coating Properties for Formulations including PARALOID™ AU-830

| Test | Ex. 9 | Ex. 10 | Ex. 11 | Ex. 12 | Comp Ex. 8 | Comp Ex. 9 | Comp Ex. 10 | Comp Ex. 11 | Comp Ex. 12 |
|---|---|---|---|---|---|---|---|---|---|
| Film thickness (mil) | 3.0-3.5 | 3.5-4.0 | 3.5-4.0 | 3.5-4.0 | 3.0-3.5 | 3.5-4.0 | 3.5-4.0 | 4.5-5.0 | 3.5-4.0 |
| Cross Hatch Adhesion | 5B | 5B | 5B | 5B | 5B | 5B | 5B | 5B | 5B |
| MEK Double Rubs | >200 | >200 | >200 | >200 | >200 | >200 | >200 | >200 | >200 |
| Konig Hardness (s) | 58 ± 2 | 55 ± 2 | 50 ± 1 | 49 ± 2 | 47 ± 3 | 54 ± 1 | 53 ± 4 | 21 ± 2 | 25 ± 2 |
| Pencil Hardness - gouge | <4B | <4B | 2B | 2B | 3B | <4B | <4B | <4B | <4B |
| Pencil Hardness - scratch | 4B | 4B | B | B | B | <4B | <4B | <4B | <4B |
| Gloss - 20° | 125 ± 1 | 125 ± 1 | 127 ± 1 | 130 ± 1 | 120 ± 1 | 122 ± 1 | 121 ± 1 | 119 ± 1 | 117 ± 1 |
| Gloss - 60° | 116 ± 1 | 118 ± 1 | 116 ± 1 | 117 ± 1 | 118 ± 1 | 117 ± 1 | 117 ± 1 | 118 ± 1 | 117 ± 1 |
| Gloss - 85° | 98 ± 1 | 101 ± 1 | 97 ± 2 | 102 ± 3 | 106 ± 3 | 100 ± 1 | 105 ± 1 | 97 ± 1 | 96 ± 1 |
| Direct Impact (N * m) | 13.6 | 15.8 | 15.8 | 15.8 | 13.6 | 18.1 | 15.8 | 11.3 | 13.6 |
| Indirect Impact (N * m) | 13.6 | 13.6 | 13.6 | 15.8 | 15.8 | 15.8 | 15.8 | 13.6 | 13.6 |

Similarly to the above, Table 5 also shows that use of polyether polyol according to embodiments with the higher viscosity acrylic polyol PARALOID™ AU-830 provides coating properties similar to, if not improved, with respect to Comparative Example 8, which does not include reactive diluent. Further, use of the polyether polyols in Examples 9-12 provides improvement with respect to hardness as compared to the use higher molecular weight polyether polyols.

Accordingly, the results in Tables 4 and 5 demonstrate that the polyether polyol may be incorporated into acrylic polyurethane coating compositions without adversely impacting the coating properties, including hardness, solvent resistance (as demonstrated by the MEK double rubs, and gloss).

Regarding moisture resistance, humidity testing was measured in accordance with ASTM Test Method D4585 for the samples prepared using VORAPEL™ T5001, a hydrophobic polyol. In particular, the gloss retention was measured at 20° after 96 hours of exposure to 100% humidity at 38° C. Measurements were taken after 1 hour of recovery and after 24 hours of recovery at ambient conditions. The results are reported in Table 6.

TABLE 6

Gloss retention

| Sample | 1 hour of Recovery (% retention) | 24 hours of Recovery (% retention) |
|---|---|---|
| Example 5 | 95 | 97 |
| Example 6 | 100 | 100 |
| Example 9 | 96 | 98 |
| Example 10 | 94 | 98 |
| Comparative Example 3 | 94 | 99 |
| Comparative Example 4 | 96 | 99 |
| Comparative Example 5 | 94 | 96 |
| Comparative Example 8 | 94 | 96 |
| Comparative Example 9 | 95 | 100 |
| Comparative Example 10 | 94 | 99 |

As shown in Table 6, the compositions including a polyether polyol exhibited gloss retention properties after both 1 hour of recovery and 24 hours of recovery that were similar to the gloss retention properties of compositions including no polyol diluents (Comparative Examples 3 and 8) or a polyester polyol diluent (Comparative Examples 4, 5, 9, and 10). Surprisingly, the gloss retention tests did not demonstrate the attraction to water, and thus, the decrease in moisture resistance, predicted in the art.

In addition, the UV weatherability for the compositions was tested for Examples 5 to 12 and Comparative Examples 3 and 8 (which do not include a reactive diluent), as related to gloss retention. In particular, the gloss retention was measured for each of the compositions over a 5,000 h QUV-A cycling period of 8 hours of UV exposure and 4 hours of humidity exposure using ASTM Test Method D4587. In particular, samples are set in a QUV chamber where they are exposed to light emitted by QUV-A bulbs for a period of 8 hours at 60° C. After 8 hours, the lights are shut off and the samples are exposed to 100% humidity for 4 hours at 50° C. These cycles are repeated over the course of the 5000 hour test. Gloss measurements are acquired for each sample in approximately 250 hour intervals using ASTM Test Method D523. Gloss measurements were acquired at approximately 250 hour intervals. The results are shown in FIGS. 3 and 4.

Figure 3:
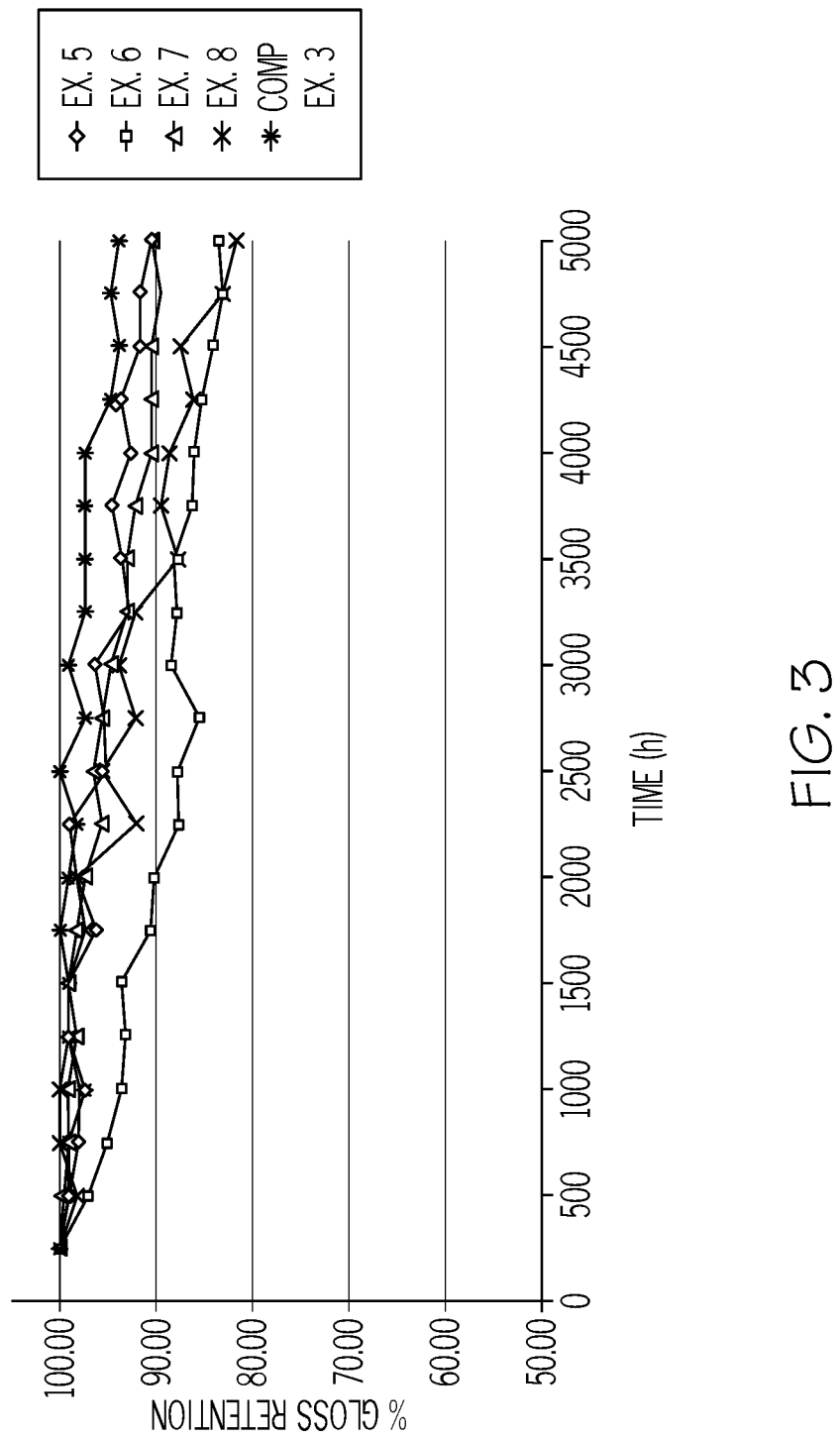
FIG. 3 graphically depicts the gloss retention (y-axis) as a function of time (x-axis) for four example acrylic polyurethane coating compositions prepared using polyol diluents and one comparative example prepared without using any added diluents.
Figure 4:
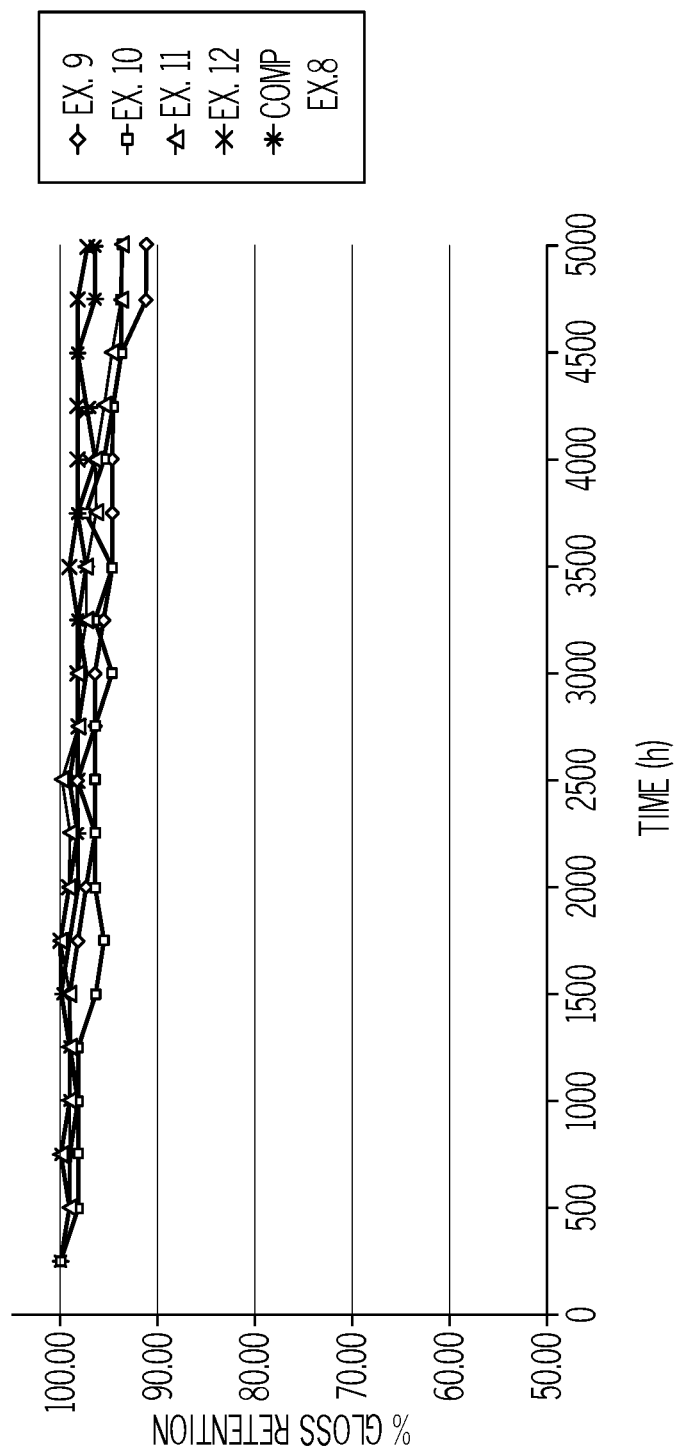
FIG. 4 graphically depicts the gloss retention (y-axis) as a function of time (x-axis) for four example acrylic polyurethane coating compositions prepared using polyol diluents, and one comparative example prepared without using any added diluents.

As shown in FIGS. 3 and 4, the gloss retention remains above 80% for all of the compositions including the polyether polyol (Examples 5 to 12) despite expecting a significant drop in gloss due to the inclusion of the polyether component.

Without being bound by theory, higher solids typically will negatively impact the pot-life, as the greater concentrations of polyols and isocyanates accelerate reaction kinetics. As used herein, "pot-life" refers to the amount of time it takes for an initial mixed viscosity to double at room temperature. One of ordinary skill in the art would know that a pot-life of at least 30 min is preferred, while a pot-life value of at least 1 hour is more preferred, and a pot-life value of greater than 2 hours is most preferred.

Accordingly, for the following examples, the solids loading was adjusted to achieve an initial viscosity in the range of 50-60 mPa*s at 25° C. Portions of a solvent blend (MIBK, butyl propionate and propyl propionate [1:1:1] (weight ratio)) were titrated into the formulation until the desired viscosity was achieved. In particular, it was noted that adjusting Comparative Example 3 to a solids loading of 53% resulted in a viscosity of approximately 52 mPa*s at 25° C.

Figure 5:
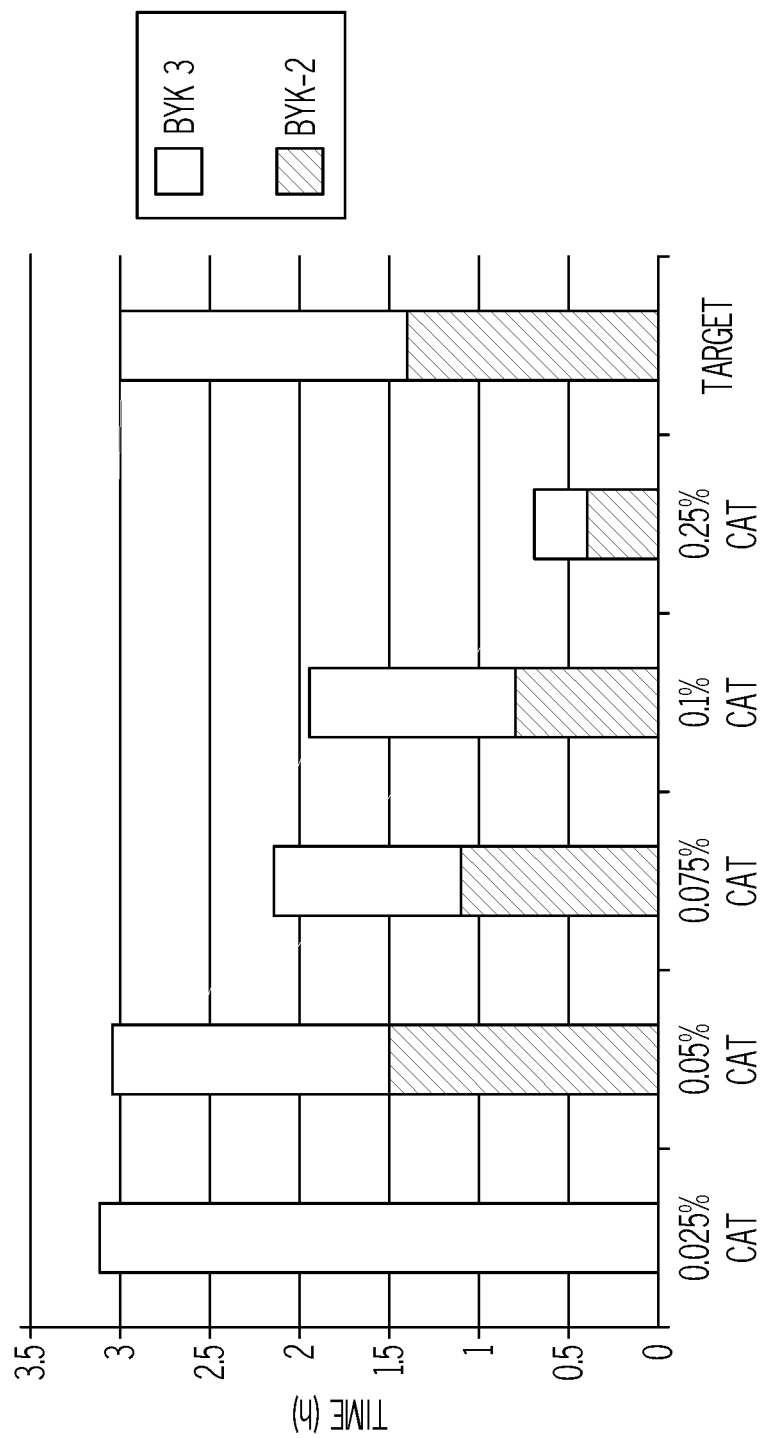
FIG. 5 graphically depicts the dry time (y-axis) for a series of example acrylic polyurethane coating compositions (x-axis) having various concentrations of catalyst.

Referring to FIG. 5, various coating compositions having 53% solids and containing various levels of DBTDL catalyst were prepared and analyzed via dry time measurements. Dry times were measured using a BYK Dry Time Recorder (available from BYK-Gardner). The dry time was measured in accordance with ASTM Test Method D5895, and both set-to-touch times and tack-free times are shown in FIG. 5.

In particular, in FIG. 5, the BYK-2 (tack free time) and BYK-3 (dry-hard time) dry times for the various compositions are shown. A BYK-3 dry time is not shown in FIG. 5 for the composition including 0.025% DBTDL because the formulation was not found to dry hard within the experiment's 6 hour window. The catalyst level of 0.025% exhibited a BYK-2 time of approximately 3 hours, which was nearly twice the target value of 1.4 hours. As shown in FIG. 5, doubling the concentration of DBTDL to 0.05% resulted in a BYK-2 time of 1.5 hours and a BYK-3 time of 3.6 hours, close to the target values of 1.4 hours and 3.0 hours, respectively. Increases in the catalyst levels continued to demonstrate dry times that were much faster than the target values.

Figure 6:
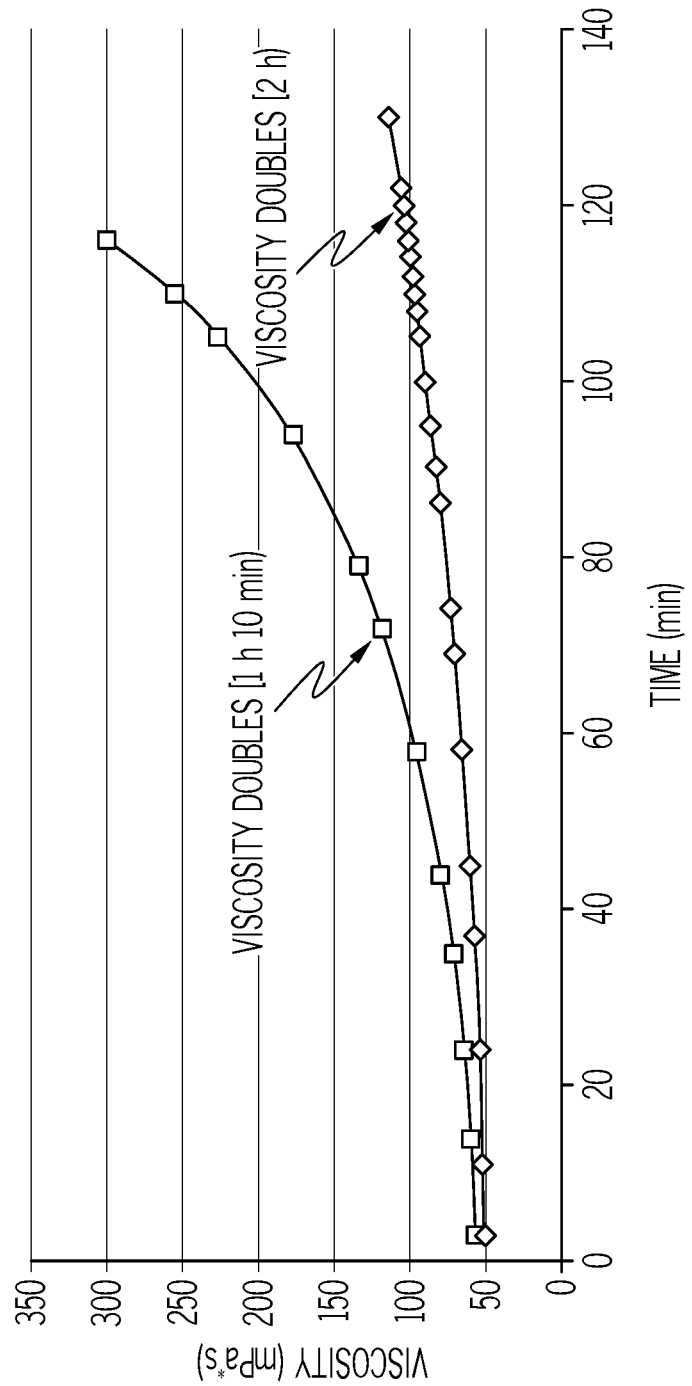
FIG. 6 graphically depicts the viscosity (y-axis) as a function of time (x-axis) for an example acrylic polyurethane coating composition having various concentrations of catalyst.

Referring to FIG. 6, both compositions including 0.05% DBTDL and 0.025% DBTDL (at a solids content of 53%), from above are further analyzed for pot-life. In particular, FIG. 6 is a graph illustrating the pot-life measurements for both compositions including 0.05% DBTDL and 0.025% DBTDL at a solids content of 53%. As shown in FIG. 6, doubling the catalyst concentration resulted in a 50% decrease in the pot-life. Specifically, the pot-life of the composition including 0.05% DBTDL was 1 hour and 10 minutes.

Referring to Table 7, the viscosity build was measured for the compositions of Table 2. Prior to measuring the viscosity build, the solids content for each of the compositions of Table 2 was adjusted to afford an initial viscosity between 50 mPa*s and 60 mPa*s, by the addition of portions of a solvent blend (MIBK, butyl propionate and propyl propionate [1:1:1] (weight ratio)). Viscosity measurements were taken using a Brookfield viscometer having an S61 spindle set to 20 rpm. The initial viscosities measured upon mixing all components are reported in Table 7.

TABLE 7

Viscosities for Adjusted Compositions of Table 2

| Sample | % Solid | Measured Viscosity (mPa * s) |
| --- | --- | --- |
| Example 5 | 56 | 57 |
| Example 6 | 58 | 56 |
| Example 7 | 56 | 55 |
| Example 8 | 57 | 48 |
| Comp. Ex. 3 | 53 | 52 |
| Comp. Ex. 4 | 55 | 53 |
| Comp. Ex. 5 | 56 | 54 |

As can be seen from Table 7, the low viscosity of the polyether polyol diluents allowed the solids content to be increased by up to 5% relative to the 53% solids content for the control (Comp. Ex. 3).

Figure 7:
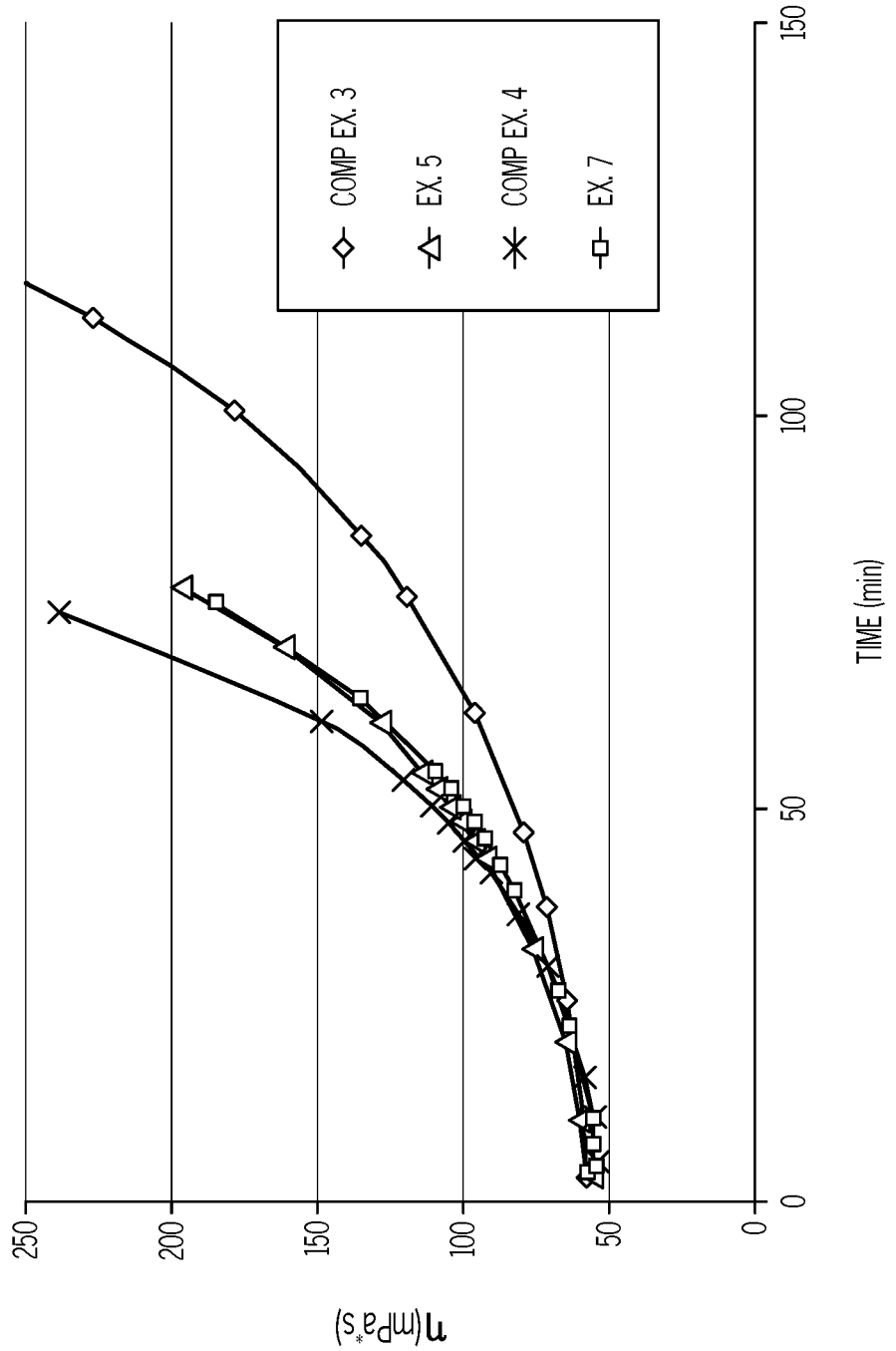
FIG. 7 graphically depicts the viscosity (y-axis) as a function of time (x-axis) for acrylic polyurethane coating compositions having a loading of 10 wt % polyol diluents, and comparative examples that do not include the polyol diluents.
Figure 8:
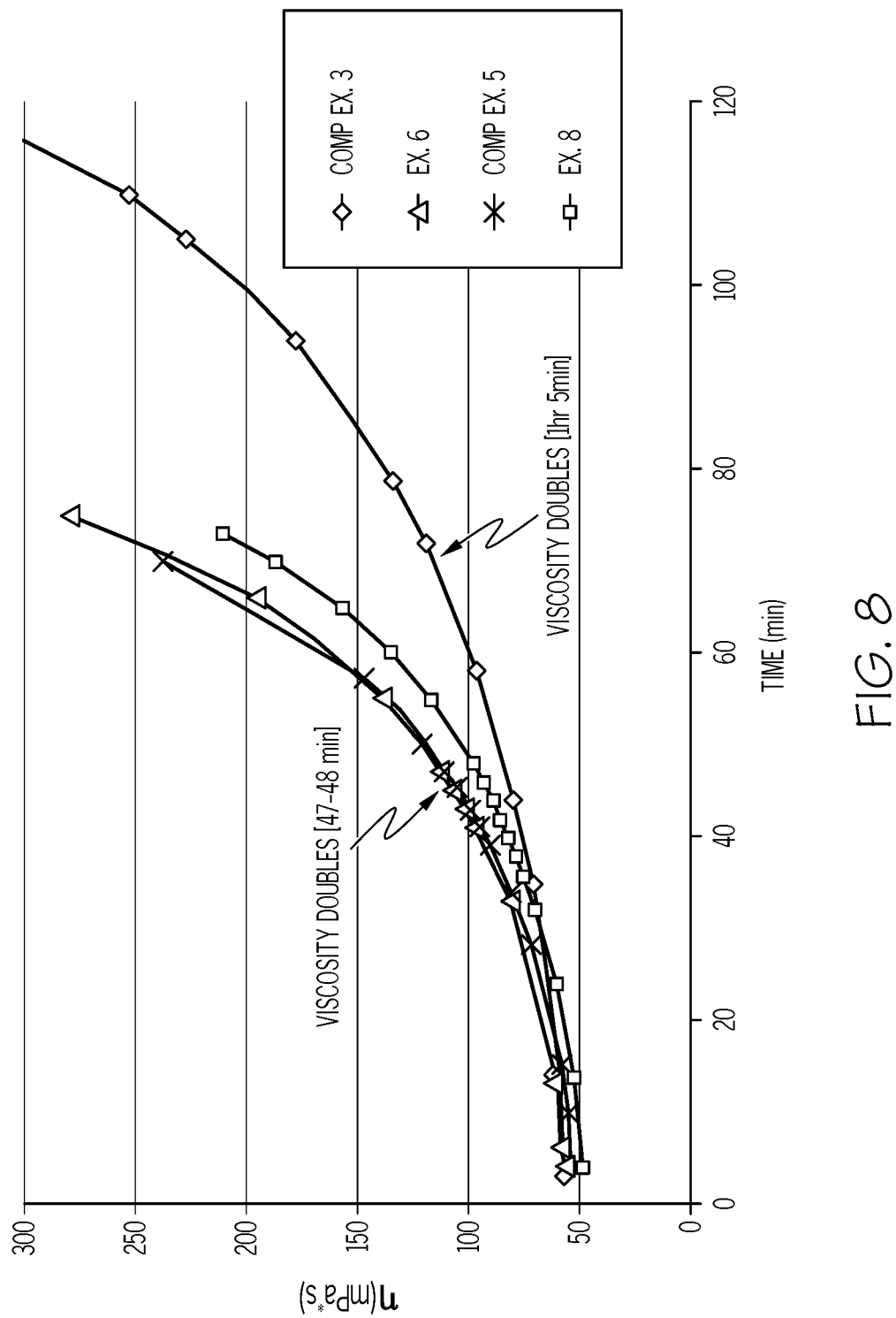
FIG. 8 graphically depicts the viscosity (y-axis) as a function of time (x-axis) for acrylic polyurethane coating compositions having a loading of 20 wt % polyol diluents, and comparative examples that do not include the polyol diluents.

Pot-life values were measured for the compositions of Table 7. The results are shown in FIGS. 7 and 8. As shown in FIGS. 7 and 8, the increased solids content resulted in a shorter pot-life for the greater concentrations of polyol diluents and isocyanate components. Without being bound by theory, the differences observed for pot-life times measured at similar solid contents suggest that the polyol diluent's composition may modulate the reactivity of the parent formulation. For example, at a loading of 10 wt % alkylene oxide polyol (shown in FIG. 7), the pot-life values were measured to range between 48 and 51 minutes. Increasing the diluent polyol loading to 20 wt % (shown in FIG. 8) afforded pot-life values of between 47 and 48 minutes, suggesting that the pot-life is slightly shortened by the greater concentration of polyol and isocyanate components.

Referring to Table 8, dry times were measured according to ASTM Testing Standard D5895 for each of the viscosity-adjusted compositions polyol diluent formulations that included 0.05% DBTDL as a catalyst and PARALOID™ AU-1453 as an acrylic polyol. Dry times, as measured using a BYK Dry Time Recorder, as well as the polyol diluent and solids content of each of the compositions, are reported in Table 8.

TABLE 8

Dry Times (in hours)

| Sample | % Solids | BYK-1 | BYK-2 | BYK-3 |
| --- | --- | --- | --- | --- |
| Control | 53 | 0.2 | 1.3 | 3.0 |
| 20% VORANOL ™ CP450 | 57 | 0.2 | 1.4 | 3.0 |
| 10% VORANOL ™ CP450 | 56 | 0.2 | 1.2 | 3.4 |
| 20% VORAPEL ™ T5001 | 58 | 0.6 | 1.4 | 3.8 |
| 10% VORAPEL ™ T5001 | 56 | 1.0 | 1.2 | 3.8 |
| 20% CAPA ™ 3050 | 56 | 0.3 | 1.2 | 3.3 |
| 10% CAPA ™ 3050 | 55 | 0.3 | 1.3 | 3.3 |

Although pot-life values were found to be similar between compositions employing VORANOL™ CP450, VORAPEL™ T5001, and CAPA™ 3050 as a polyol diluent, dry times appeared to depend more upon the polyol identity. As shown in Table 8, the dry times associated with the compositions that included polyether polyols (VORANOL™ CP450 and VORAPEL™ T5001) were comparable to the dry times for the control composition and compositions including a polyester polyol (CAPA™ 3050) as a diluent. Notably, compositions employing polyether polyols exhibited BYK-1 dry times (set to touch) that may be lower than compositions employing the caprolactone polyester polyol (CAPA™ 3050). VORAPEL™ T5001-containing compositions were found to exhibit the slowest BYK-1 times. Without being bound by theory, the slower BYK-1 times may be attributed to the slower rate of reaction of the somewhat hindered secondary alcohols in the polyol. Surprisingly, the sample containing 20 wt % VORANOL™ CP450 behaved almost identically to the control despite the inclusion of secondary hydroxyls in the VORANOL™ CP450.

Moreover, the compositions including polyether polyols included an equal or greater amount of solids than the comparative compositions, indicating that the use of polyether polyols as a diluent was effective to raise the solids contents of the formulations without modulating dry times.

It is desirable for the shorter pot-life values measured for the higher solids formulations to be extended without significantly modulating dry times. One route toward extending the pot-life values of the higher solids formulations involves the addition of an acid source. The acid source may include, for example, a carboxylic acid. The acid source may be incorporated into formulations as an additive or exist a comonomer of the acrylic polyol.

Pot-life extension of a higher solids formulation was evaluated by adding benzoic acid (at 0.4 wt % and 0.8 wt % loading relative to the formulation's total mass) to the 20% VORANOL™ CP450 formulation (57% solids) shown in Table 8. Pot-life values were measured for the formulations. Viscosity measurements were taken using a Brookfield viscometer having an S61 spindle set to 30 rpm. Pot-life values were found to be extended from 48 min without benzoic acid to 112 min in the presence of 0.4 wt % benzoic acid and 155 min in the presence of 0.8 wt % benzoic acid.

Referring to Table 9, dry times measured for each of the samples containing benzoic acid. Surprisingly, although the pot-life values had been extended by at least two-fold, dry time values were not significantly extended. Without being bound by theory, these results suggest that a variety of acids could be used to offset the shorter pot-life values incurred by raising the solids content using polyol diluents.

TABLE 9

Dry Times (in hours)

| Sample | % Solids | Benzoic Acid (wt %) | BYK-1 | BYK-2 | BYK-3 |
| --- | --- | --- | --- | --- | --- |
| Control | 53 | 0 | 0.2 | 1.3 | 3.0 |
| 20% VORANOL ™ CP450 | 57 | 0 | 0.2 | 1.4 | 3.0 |
| 20% VORANOL ™ CP450 | 57 | 0.4 | 0.3 | 1.0 | 2.5 |
| 20% VORANOL ™ CP450 | 57 | 0.8 | 0.6 | 1.6 | 3.7 |

Conventionally, manufacturers have been limited to the use of polyester and caprolactone polyols as reactive diluents to adjust the viscosity of polyurethane coating compositions without sacrificing other desirable properties.

Specifically, it was conventionally believed that the use of polyether polyols would require the manufacturer to sacrifice one or more desirable properties, such as moisture resistance, UV weatherability, or solvent resistance. However, as shown herein, acrylic polyurethane coatings formed from compositions including polyether polyols exhibit desirable coating properties, and dry time values desired for various applications, while also maintaining a high solids content.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. An acrylic polyurethane coating composition, comprising:
    an isocyanate component comprising at least one aliphatic polyisocyanate trimer or biuret; and
    an isocyanate reacting mixture, the isocyanate reacting mixture comprising from 25 wt % to 80 wt % of an acrylic polyol and from 1 wt % to 30 wt % of a polyether polyol, based on a total weight of the acrylic polyurethane coating composition, the acrylic polyol having a solids content of at least 50 wt %, based on a total weight of the acrylic polyurethane coating composition, and wherein the polyether polyol is a triol having a hydroxyl number from 250 mg KOH/g to 450 mg KOH/g, a viscosity of less than 500 mPa*s at 25° C. and a number average molecular weight greater than 300 and less than 700.

2. The acrylic polyurethane coating composition according to claim 1, wherein the acrylic polyol has a hydroxyl equivalent weight, on a solids basis, of from 350 to 550 g/mol equivalence.

3. The acrylic polyurethane coating composition according to claim 1, further comprising an organic solvent in an amount less than 22 wt %, based on the total weight of the isocyanate reacting mixture.

4. The acrylic polyurethane coating composition according to claim 1, wherein the polyether polyol is a polyoxybutylene polyol.

5. The acrylic polyurethane coating composition according to claim 1, wherein the polyether polyol is a polyoxypropylene polyol.

6. The acrylic polyurethane coating composition according to claim 1, wherein the isocyanate reacting mixture further includes a carboxylic acid source and has an acid number value of 2.5 mg KOH/g to 8.0 mg KOH/g.

7. The acrylic polyurethane coating composition according to claim 1, wherein a ratio of the acrylic polyol to the polyether polyol is from 5 to 15.

8. The acrylic polyurethane coating composition according to claim 1, wherein:
    the isocyanate component is present in an amount of from 15% to 40% by weight based on the polyurethane coating composition and the isocyanate reacting mixture is present in an amount of from 25% to 60% by weight based on the polyurethane coating composition, and
    the polyurethane coating composition has a solids content of greater than 50%.

9. A method of forming an acrylic polyurethane coating from the acrylic polyurethane coating composition according to claim 1, comprising allowing the isocyanate component and the isocyanate reacting mixture to mix.

* * * * *